May 23, 1967  O. A. ENGEL  3,320,627
REAR VIEW MIRROR WIPER

Filed May 13, 1965  2 Sheets-Sheet 1

INVENTOR
OTTO A. ENGEL
BY
Donnelly, Mentag & Harrington
ATTORNEYS

May 23, 1967    O. A. ENGEL    3,320,627
REAR VIEW MIRROR WIPER
Filed May 13, 1965    2 Sheets-Sheet 2
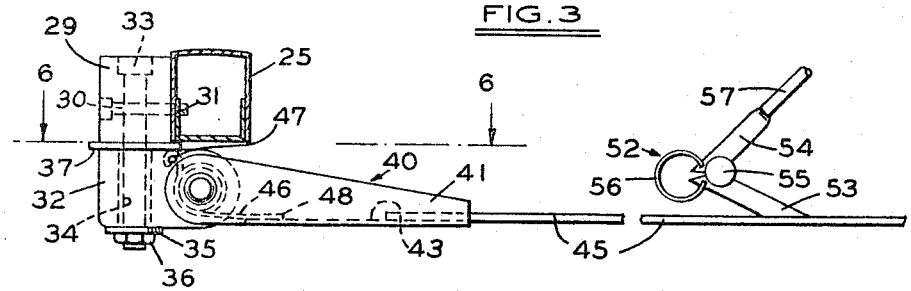
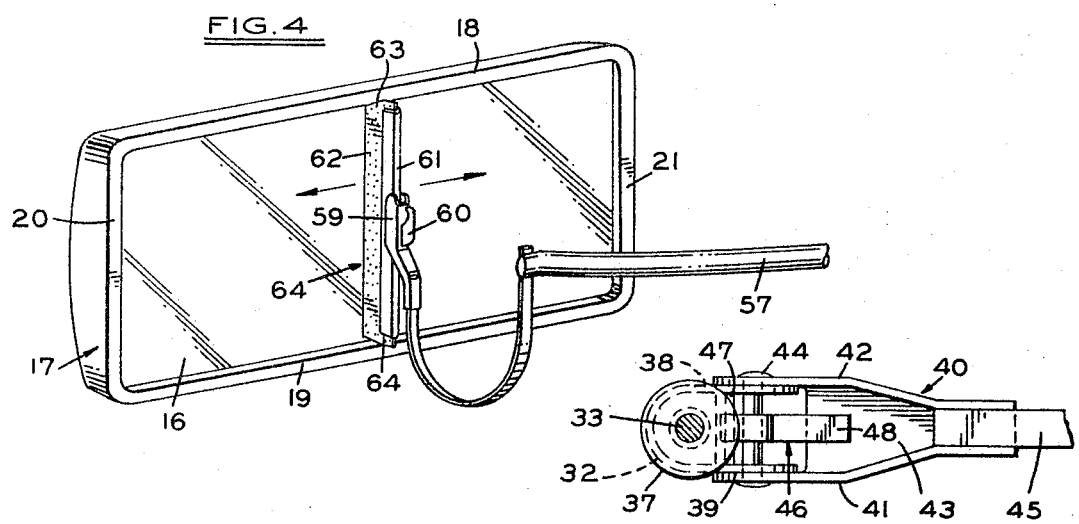
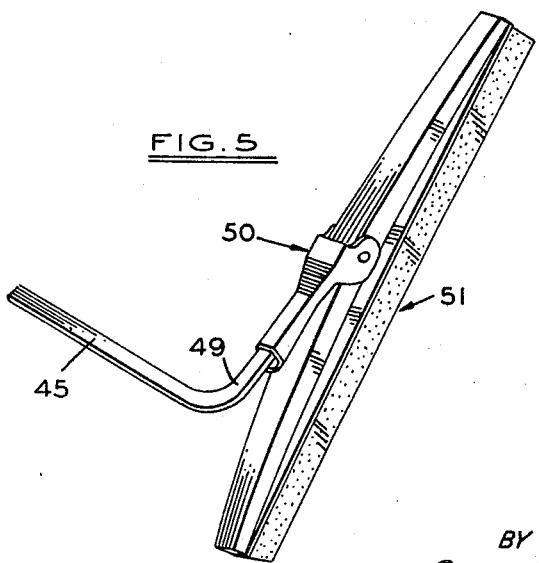
INVENTOR
OTTO A. ENGEL
BY Donnelly, Mentag & Harrington
ATTORNEYS United States Patent Office
3,320,627
Patented May 23, 1967

3,320,627
REAR VIEW MIRROR WIPER
Otto A. Engel, 8086 Westwood St.,
Detroit, Mich. 48228
Filed May 13, 1965, Ser. No. 455,461
6 Claims. (Cl. 15—250.29)

This invention relates generally to the vehicle rear view mirror art, and more particularly, to a novel and improved wiper apparatus for rear view mirrors mounted on the front fenders of a vehicle.

In many of the present automobiles, trucks and other vehicles, the rear view mirrors are mounted on the left front fender beyond the arm reach of the driver when he is sitting in the driver's seat. Consequently, if the rear view mirror becomes fogged or full of water, it is useless during travel of the vehicle and this situation is dangerous and creates a safety problem. A second rear view mirror may also be mounted on the right front fender. Accordingly, it is an important object of the present invention to provide a novel and improved wiper apparatus for a rear view mirror mounted on a fender of a vehicle for wiping away fog and rain.

It is another object of the present invention to provide a novel and improved wiper apparatus for a fender mounted vehicle rear view mirror which may be operated by the usual windshield wiper on the adjacent side of the vehicle, and which may be quickly and easily attached to the regular windshield wiper and operated therewith.

It is a further object of the present invention to provide a novel and improved wiper system for a vehicle rear view mirror, mounted on the vehicle fender on the driver's side, and which includes a wiper for the rear view mirror and a supplementary windshield wiper for wiping the windshield in the line of vision between the driver's seat and the rear view mirror on the vehicle fender. A second wiper system may also be employed on the other side of the vehicle.

It is still another object of the present invention to provide a novel and improved fender mounted vehicle rear mirror wiper apparatus which is simple and compact in construction, economical of manufacture, and efficient in operation.

It is still another object of this invention to provide a wiper apparatus for a vehicle rear view mirror mounted on a vehicle fender including, a first arm hinged to the vehicle's regular windshield wiper, a wiper adapted to engage the rear view mirror, a second arm hinged to said first arm at one end thereof and to said rear view mirror wiper at the other end thereof, and an auxiliary windshield wiper attached to said first arm for cleaning the portion of the windshield which lies in the vehicle driver's line of vision with the rear view mirror.

Other objects, features and advantages of this invention will be apparent from the following detailed description, appended claims, and accompanying drawings.

In the drawings:

FIG. 3 is an enlarged, fragmentary, broken horizontal plan view of the structure illustrated in FIG. 1, taken along the line 3—3 thereof, and looking in the direction of the arrows;

FIG. 4 is an enlarged, fragmentary, elevational view of the structure illustrated in FIG. 2, taken along the line 4—4 thereof, and looking in the direction of the arrows;

FIG. 5 is an elevational, perspective view of the third windshield wiper employed in the invention; and, FIG. 6 is a fragmentary plan view of the structure illustrated in FIG. 3, taken along the line 6—6 thereof, and looking in the direction of the arrows.

Figure 1:
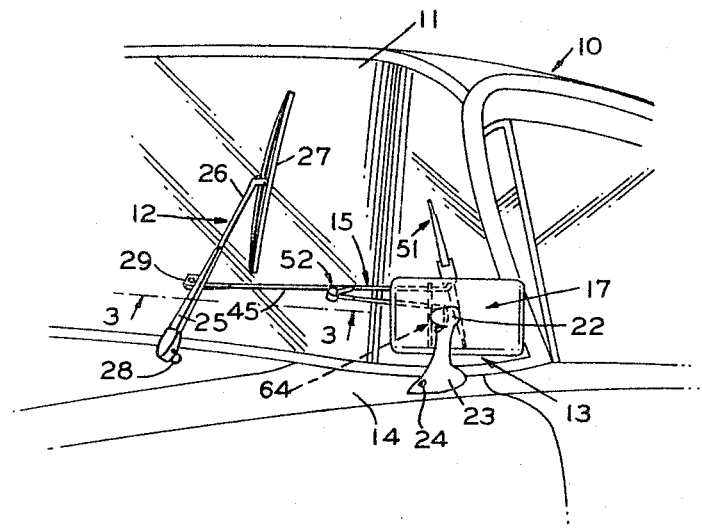
FIG. 1 is a fragmentary, perspective view of the left front portion of the windshield of a conventional vehicle, showing the usual windshield wiper, rear view mirror on the left front fender, and a rear view mirror wiper apparatus made in accordance with the principles of the present invention.
Figure 2:
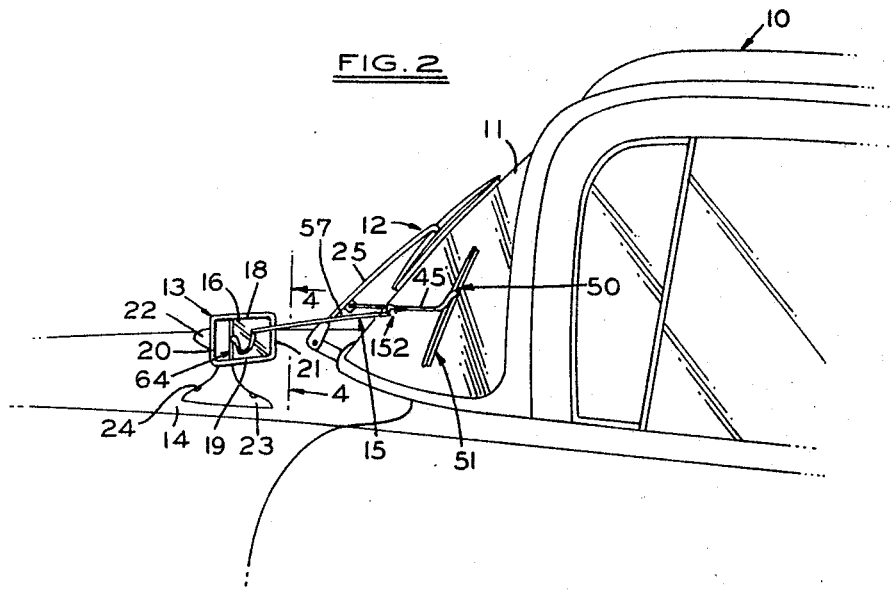
FIG. 2 is a fragmentary, perspective view of the structure illustrated in FIG. 1, taken from the right side thereof.

Referring now to the drawings, and in particular to FIGS. 1 and 2, the numeral 10 generally designates a conventional passenger automobile which is provided with a rear view mirror wiper system made in accordance with the principles of the present invention. The numeral 11 indicates the windshield of the vehicle and the numeral 12 designates a conventional windshield wiper disposed on the left side or driver's side of the vehicle.

The rear view mirror generally indicated by the numeral 13 is mounted on the left front fender 14 in a position beyond the reach of the driver so that it cannot be cleaned by the driver while the vehicle is in motion. The numeral 15 generally designates an illustrative embodiment of the wiper system of the present invention.

As best seen in FIG. 4, the illustrative rear view mirror 13 is of conventional construction and comprises the elongated mirror 16 which is rectangular in plan configuration and positioned with the longer axis disposed horizontally. The mirror 16 is secured in a housing generally indicated by the numeral 17. The front edges of the housing 17 are folded over in a conventional manner against the mirror 16 to retain it in the housing. The folded over housing edges form the spaced apart horizontal flanges 18 and 19, and the spaced apart vertical flanges 20 and 21 disposed about the periphery of the mirror 16. As shown in FIG. 1, the mirror housing 17 is swivelly connected in a conventional manner by a pivot structure 22 to the upper end of the mounting stand 23 which is secured to the fender of the automobile by any suitable means, as by screws 24.

As shown in FIG. 1, the vehicle 10 is provided with the usual windshield wiper 12 in front of the driver's position on the left hand side of the vehicle. The usual or conventional wiper 12 comprises a tubular arm 25 to the upper end of which is fixed the resilient arm 26 that carries the conventional windshield wiper 27 at the upper end thereof. The tubular arm 25 is pivotally mounted at the point 28 in the usual manner on the drive post of a conventional vehicle windshield wiper drive means.

As shown in FIG. 3, an attachment block 29 is fixed to the inner side of the tubular wiper arm 25 by any suitable means, as by a pair of screws 30. The screws 30 are adapted to be threadably mounted in suitable holes as 31 formed through the side wall of the tubular wiper arm 25. Rotatably mounted on the lower side of the block 29 is a wiper arm support and journal member 32 which is rotatably mounted on the support block 29 by the bolt 33. The bolt 33 passes down through the block 29 and extends through the hole 34 in the journal member 32 and is secured in place by the thrust washer 35 and lock nut 36. A suitable washer 37 is mounted between the lower end of the support block 29 and the journal member 32.

As shown in FIGS. 3 and 6, the journal member 32 is provided with a pair of outwardly extended, spaced apart plates 38 and 39 which are fixed to the journal member by any suitable means, as by welding. The plates 38 and 39 form a hinge or pivot bracket for the wiper arm portion, generally indicated by the numeral 40 in FIG. 4. The wiper arm portion 40 comprises a part of what may be termed the first wiper arm of the rear view mirror wiper apparatus. The wiper arm portion 40 comprises the pair of spaced apart plates 41 and 42 which are enclosed at the lower end thereof by the transverse wall 43, as shown in FIG. 4. The left end of the plates 41 and 42, as viewed in FIG. 6, are hinged to the bracket plates 38 and 39 by any suitable means, as by hinge pin 44. As shown in FIG. 6, the outer ends of the arm plates 41 and 42 converge upon each other and have fixed therebetween the inner end of the first wiper arm portion 45, by any suitable means, as by welding. The wiper arm portion 40 is adapted to be biased toward the windshield 11 of the vehicle 10, as viewed in FIG. 1, by a suitable spring means. As shown in FIGS. 4 and 6, a suitable coil spring 46 is mounted between the plates 41 and 42 with the inner end mounted about the transverse pin 47 which is fixed between the hinge bracket walls 38 and 39. The outer end of the coil spring 46 is indicated by the numeral 48 in FIG. 4, and it abuts the lower wall 43 of the arm portion 40 so as to bias the arm portion 40 towards the windshield 11.

As shown in FIGS. 1 and 2, the first wiper arm portion 45 extends to the left side of the vehicle and carries the wiper arm assembly 51. As shown in FIG. 5, the outer end of the first wiper arm portion 45 is provided with a right angled terminal portion 49 on which is operatively mounted the windshield wiper hinge connector mechanism, generally indicated by the numeral 50, which hingedly supports the conventional wiper assembly 51. The members 50 and 51 may comprise any suitable wiper and wiper arm supporting structure, as for example that shown in Patents 2,752,626 and 2,877,822.

A second wiper supporting arm 57 is operatively connected to the first arm portion 45 by the double acting spring joint structure, generally indicated by the numeral 52 in FIG. 3. The joint structure 52 includes a first arm 53 having one end fixed to the first wiper arm portion 45 by any suitable means, as by welding. The other end of the joint arm 53 supports a pivot pin 55 on which is mounted one end of the joint arm 54. The other end of the joint arm 54 is fixed to the second wiper arm 57 by any suitable means, as by welding. The adjacent ends of the joint arms 53 and 54 are retained in operative position on the hinge pin 55 by any suitable spring means, as by the split ring spring 56. It will be seen that the spring 56 permits the joint arm 54 to be moved either toward or away from the joint arm 53 in accordance with the motion transmitted to the second wiper arm 57 from the first wiper arm portion 45.

As shown in FIGS. 1 and 2, the joint 52 connects the second wiper arm 57 to the first wiper arm comprising the portions 40 and 45 at a position approximately halfway between the wiper arm 25 and the supplementary or auxiliary wiper assembly 51. The wiper arm 57 extends outwardly away from the windshield 11 towards the rear view mirror 16.

As shown in FIG. 4, the outer end of the second wiper arm 57 is fixedly connected to one end of the U-shaped wiper blade attachment arm 58, by any suitable means, as by welding. Fixed to the other end of the U-shaped attachment arm 58 is the conventional wiper blade attachment bracket 59 which receives the wiper blade mating attachment bracket 60 in the usual manner. Fixed to the attachment bracket 60 by means of the supporting housing 61 is the vertical wiper blade 62. The rear view mirror wiper assembly is generally indicated by the numeral 64. The wiper blade 62 extends upwardly and downwardly and has the outer edges 63 and 64 in engagement with the upper and lower mirror housing flanges 18 and 19 for guiding the wiper blade 62 over the surface of the rear view mirror 16.

In use, when the regular or conventional windshield wiper 12 is operated, the auxiliary or supplementary windshield wiper assembly 51 is moved so as to clean the portion of the windshield 11 which is in the line of vision between the driver's seat and the rear view mirror 16. The spring 46 maintains an inwardly directed pressure on the first wiper arm so as to normally bias the windshield wiper assembly 51 into operative engagement with the windshield 11. Simultaneously, the spring joint 52 maintains a forward bias on the second arm 57 to bias the wiper 64 into wiping engagement with the surface of the rear view mirror 16. It will be seen, that as the regular windshield wiper 12 moves through its wiping cycle, the wiper arms 45 and 57 will actuate the wipers 51 and 64 to provide a driver with clear vision to the rear view mirror 16, and to enable him to employ the rear view mirror in the usual manner regardless of the fog or the rain conditions. It will be understood, that other suitable joint structures could be used for the joint 52 other than that shown and that the wiper arms 45 and 57 may be formed with different type cross sections than that shown in the drawings. The stroke of the rear view mirror wiper assembly 64 is limited by the stroke of the main regular wiper 12. The aforedescribed rear view mirror operating structure provides a straight lateral wiping action over the surface of the rear view mirror 16 in a path of travel which extends from the mirror housing flange 20 to the flange 21, and then back to flange 20. It will be understood, that a second similarly constructed rear view mirror wiper apparatus may also be mounted on the right side of the vehicle for operation by the windshield wiper on the right side of the vehicle.

Actual experience has shown that the rear view mirrow wiper apparatus of the present invention is a simple and economic safety apparatus which provides clear rear view mirror vision to a vehicle driver, regardless of the fog or rain outside of the vehicle, and which enables the driver to more safely guide his car through such inclement weather.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:
1. In a wiper apparatus for a vehicle rear view mirror mounted on a vehicle fender, for attachment to the arm of the vehicle windshield wiper adjacent said fender, the combination comprising:
 (a) a first rear view mirror wiper arm;
 (b) means hingedly connecting one end of said first rear view mirror wiper arm to the arm of a vehicle windshield wiper for movement therewith;
 (c) a second rear view mirror wiper arm;
 (d) means hingedly connecting one end of said second rear view mirror wiper arm to said first rear view mirror wiper arm for movement therewith; and,
 (e) a rear view mirror wiper attached to the other end of said second rear view mirror wiper arm, whereby when the arm of the vehicle windshield wiper is actuated the rear view mirror wiper will be actuated over the rear view mirror in a back and forth cleaning movement.

2. The wiper apparatus as defined in claim 1, including:
 (a) an auxiliary windshield wiper attached to the other end of said first rear view mirror wiper arm and operated thereby to clean the vehicle windshield portion in the line of vision between the vehicle driver's seat and the rear view mirror.

3. The wiper apparatus as defined in claim 1, wherein said means hingedly connecting one end of said first rear view mirror wiper arm to the arm of a vehicle windshield wiper includes:
 (a) a journal member hingedly connected to the arm of the vehicle windshield wiper;
 (b) a hinge bracket connected to said journal member;
 (c) said one end of said first rear view mirror wiper arm being hinged to said hinge bracket; and,
 (d) means mounted between said hinge bracket and said first rear view mirror wiper arm for normally biasing said first rear view mirror wiper arm toward the windshield of the vehicle.

4. The wiper apparatus as defined in claim 3, wherein:
   (a) said means for normally biasing said first rear view mirror wiper arm toward the windshield comprises a spring means.

5. The wiper apparatus as defined in claim 1, wherein said means hingedly connecting one end of said second rear view mirror wiper arm to said first rear view mirror wiper arm includes:
   (a) means for normally biasing said second rear view mirror wiper arm toward the rear view mirror.

6. The wiper apparatus as defined in claim 5, wherein:
   (a) said means for normally biasing said second rear view mirror wiper arm toward the rear view mirror comprises a spring means.

No references cited.

CHARLES A. WILLMUTH, *Primary Examiner*.